United States Patent [19]

Schulz

[11] Patent Number: 4,963,257
[45] Date of Patent: Oct. 16, 1990

[54] BUOYANT COARSE MEDIA FLOCCULATOR

[76] Inventor: Christopher R. Schulz, 46 Ancell St., Alexandria, Va. 22305

[21] Appl. No.: 405,213

[22] Filed: Sep. 11, 1989

Related U.S. Application Data

[63] Continuation-in-part of Ser. No. 173,611, Mar. 25, 1988, Pat. No. 4,865,734.

[51] Int. Cl.⁵ .............................................. C02F 1/52
[52] U.S. Cl. .................................... 210/279; 210/205; 210/291
[58] Field of Search ............... 210/661, 714, 715, 786, 210/792–796, 190, 205, 207, 208, 220, 263, 275, 279, 289, 291, 519, 521, 525

[56] References Cited

U.S. PATENT DOCUMENTS

| | | | |
|---|---|---|---|
| 468,984 | 2/1892 | Boeing | 210/283 |
| 3,419,491 | 12/1968 | Messa | 210/715 |
| 3,923,649 | 12/1975 | Sparham et al. | 210/715 |
| 4,115,266 | 9/1978 | Ohshima | 210/786 |
| 4,391,703 | 7/1983 | Crosby | 210/218 |
| 4,446,027 | 5/1984 | Simmers | 210/291 |
| 4,448,689 | 5/1984 | von Nordenskjold | 210/521 |
| 4,608,181 | 8/1986 | Hsiung et al. | 210/786 |
| 4,743,382 | 5/1988 | Williamson et al. | 210/792 |
| 4,865,734 | 9/1989 | Schulz | 210/279 |

Primary Examiner—Peter Hruskoci
Attorney, Agent, or Firm—Richard C. Litman

[57] ABSTRACT

A coarse media flocculator utilizes buoyant media restrained against upward movement in a flocculator chamber whose cross-sectional area increases uniformly in the direction of vertical flow, thereby providing a uniformly tapering velocity gradient. The height of the media bed within the chamber is alterable, thereby changing its depth and cross-sectional characteristics within the tapered chamber. The velocity gradients of the flocculator can thus be changed independent of flow. The media restrainer comprises interlocked cooperating gratings each respectively joined to an opposite wall of the flocculator housing by a tracking mechainsm. Upon manipulation of a motor device, one grating is horizontally extended or retracted, producing a lowering or raising of the restrainer as its cross-sectional area is respectively enlarged or reduced. During this alteration of the area and elevation of the restrainer, which takes place in a smooth continuous manner, the cross-section and vertical height of the media bed constrained therebeneath are simultaneously varied, with a consequent adjustment of the flocculation parameters of the media bed.

13 Claims, 4 Drawing Sheets

BUOYANT COARSE MEDIA FLOCCULATOR

CROSS-REFERENCE TO RELATED APPLICATION

This is a continuation-in-part of my pending application Ser. No. 173,611 filed Mar. 25, 1988 now U.S. Pat. No. 4,865,734.

BACKGROUND OF THE INVENTION

1. Field of the Invention

This invention relates generally to flocculators as used in the treatment of water and wastewater and which are provided with improved means to control the mixing intensity for flocculation.

More specifically, this invention relates to hydraulic flocculators wherein flocs are formed by the passage of water through a bed of buoyant coarse media and wherein the control means for altering the mixing intensity for flocculation includes a media restrainer capable of exhibiting a variable cross-sectional area within a vertically tapered chamber. In this manner, the vertical and lateral dimensions of the media bed are respectively altered so that the mixing intensity can be varied independent of the flow rate through the flocculator.

2. Description of the Prior Art

Flocculation is the process of gentle and prolonged agitation during which coagulated particles suspended in a liquid, such as water or wastewater, coalesce in to larger masses which are removed by subsequent treatment processes, particularly sedimentation.

There are two classes of flocculators: mechanical flocculators and hydraulic flocculators. In mechanical flocculators, mechanical means are used to agitate the liquid. The speed of mechanically operated paddles or turbines as used in mechanical flocculators can be adjusted to suit variations in flow, temperature, or quality of the untreated liquid independent of the rate of flow through the flocculator. Mechanical flocculators, however, are often subject to flow short-circuiting, i.e., a portion of the incoming liquid passes through the flocculation chamber in less than the nominal detention period. Consequently, this portion of the liquid is not fully exposed to the agitation imparted by the flocculator paddles or turbines.

In hydraulic flocculators, agitation is induced by the flow of liquid through the flocculator. Hydraulic flocculators are generally simpler and less expensive than mechanical flocculators because they do not require complicated mechanical equipment. In places where it is feasible to use gravity to bring the untreated liquid to the flocculator for treatment, hydraulic flocculators do not need an outside source of power such as raw water pumping to provide the energy input necessary for flocculation. In the past, however, hydraulic flocculators have exhibited several disadvantages which have limited their use in water and waste-water treatment plants. These include: (1) very limited flexibility to respond to changes in the quality of the raw water or wastewater; (2) their hydraulic and consequent flocculation parameters are a function of flow and cannot be adjusted independently; (3) energy (or head) loss across the flocculator is appreciable and often dictates that additional pumping capacity be installed upstream from the flocculator unit; and (4) cleaning can be difficult.

Hydraulic flocculators make use of baffled channels, hydraulic jet-action, or a bed of coarse media to induce mixing for flocculation. In coarse media flocculators, agitation of the liquid is created by the passage thereof through a bed of coarse media, such as gravel.

Coarse media flocculators offer several unique advantages over mechanical and other types of hydraulic flocculators: (1) the coarse media provide ideal conditions for floc formation because of the continuous and uniform particle recontacts provided by the sinuous flow of liquid through the interstices (i.e., void spaces) formed by the media; (2) agglomerated flocs are stored within the coarse media bed, reducing sludge-storage requirements in subsequent treatment units; and (3) flocculation time can also be reduced considerably in coarse media flocculators, to as little as one-sixth of the time required by mechanical flocculators, because the entire bed is effective in the formation of sizable flocs—there is very little short-circuiting of flow through the chamber, and very few dead spaces which do not receive adequate mixing.

It is known in the prior art that tapered velocity gradients in a coarse media flocculator can be achieved by two methods, which may be used alone or in combination. In the first method, a graduated flocculation chamber is used, i.e., one in which the cross-sectional area of the chamber increases in increments. In the second method, several layers of coarse media are used, each comprising media of a different size and graded from small to large in the direction of flow.

However, in the course of using either of the above methods, the velocity gradients increase in increments, rather than continuously. In addition, the velocity gradients are still a function of flow and cannot be readily adjusted independent of the rate of flow. Furthermore, gravel-bed flocculators are susceptable to fouling, either by intercepted flocs or by biological growth in the gravel. Cleaning of the media bed can be difficult due to its densely-packed nature and because expansion of the media bed by backwashing is not feasible due to the weight and large size of the media. Therefore, gravel-bed flocculators must be cleaned manually or by means of complex and expensive backwashing and/or air scouring equipment.

No prior patents are known of flocculators making use of buoyant coarse media and with a displaceable media restrainer capable of providing a variable effective cross-sectional area. There are, however, patents covering filters utilizing buoyant media. An example will be found in U.S. Pat. No. 468,984 Boeing, which discloses an upflow filter having a bed of buoyant media comprising wood blocks restrained by a horizontal partition. Other examples will be found in U.S. Pat. Nos. 4,115,266 to Ohshima and 4,608,181 to Hsiung et al., as well as British Patent No. 1,147,054 to Miks. None of these prior art devices is seen to suggest the unique combination as called for in the instant invention.

SUMMARY OF THE INVENTION

The present invention utilizes a bed of buoyant coarse media restrained against upward movement in a flocculation chamber by a permeable horizontal partition or restrainer assembly. The chamber is tapered so that the area of its horizontal cross-section increases uniformly in the direction of flow. Fluid actuated or mechanical control means are provided whereby the vertical position of the restrainer assembly can be changed simultaneously with its lateral extent, thus changing the depth and cross-sectional characteristics of the media bed constrained therebeneath, even while the apparatus is in operation. The flocculator chamber is constructed with at least one wall disposed at an inclination, with the media bed preferably being retained within the vertical confines of the tapered area formed by the inclined wall, throughout adjustment thereof. Through manipulation of the control means, the restrainer is simultaneously laterally and vertically adjusted within the tapered portion of the flocculator chamber and thereby can be positioned at various depths to alter the cross-sectional area and consequent flocculation parameters in both the upper and lower portions of the media bed.

The foregoing construction is most advantageously practiced in a downflow apparatus, as opposed to an upflow operation. It will be appreciated that in a downflow system, with a continually increasing horizontal cross-section in the downward direction, the media bed is more easily laterally expanded as the top surface thereof is urged downwardly. Also, the restrainer means atop the media bed need not be as large as that required in an upflow apparatus. Additionally, flocs will be free to drop out of the bottom of the media bed, unlike an upflow system wherein flocs would tend to accumulate in the upper level of the media, adjacent the restrainer means thereatop.

Accordingly, one of the objects of the present invention is to provide an improved buoyant coarse media flocculator wherein the velocity gradients can be varied independent of the rate of liquid flow or discharge.

It is a further object of the present invention to provide an improved buoyant coarse media flocculator including displaceable media bed restrainer means operable to alter the effective cross-sectional area of exposed media.

Another object of the present invention is to provide an improved coarse media flocculator utilizing buoyant media within a chamber having one or more inclined walls and including means for adjusting the vertical position of the media bed within that chamber, whereby the depth and cross-sectional characteristics of the media bed can be changed, in a continuous manner.

A further object of the present invention is to provide an improved buoyant coarse media flocculator wherein a media bed is disposed within a chamber whose cross section increases uniformly and not incrementally, in the direction of vertical flow through the chamber, whereby the velocity gradient decreases uniformly as liquid flows through the media bed, thereby enhancing floc formation and discouraging shearing of flocs.

Still another object of the present invention is to provide an improved buoyant coarse media flocculator having a multi-part media restrainer spanning a chamber having at least one tapered wall, with displacement means operable to extend and contract the horizontal extent of the restrainer while altering its height within the chamber, to vary the exposed cross-sectional area of the media therein.

A related object of the present invention is to provide an improved buoyant coarse media flocculator having a media restrainer which is adjustable in a horizontal direction by means of displaceable motor means carried by the restrainer and engageable with opposite walls of the flocculator chamber.

A further object of the present invention is to provide an improved buoyant coarse media flocculator having a media restrainer which is adjustable in a horizontal direction upon operation of shifting means that additionally causes a raising or lowering of the restrainer while tracking means carried by opposite ends of the restrainer maintain a horizontal disposition of the restrainer as it is simultaneously vertically and horizontally displaced.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
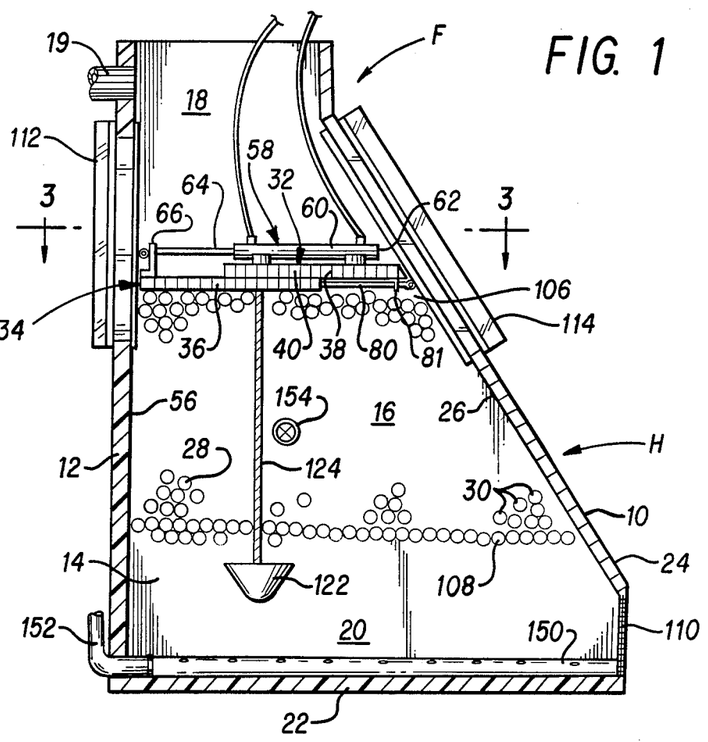
FIG. 1 is a vertical sectional view of a downflow flocculator according to the present invention.

Referring now to the drawings, particularly FIG. 1, the present invention will be understood to relate to a flocculator, generally designated F and which comprises a peripheral housing H including opposed front and rear walls 10,12 joined by a pair of end walls 14—14 to provide an interior flocculator chamber 16. The housing is constructed of any suitable material, such as concrete, steel or fiberglass and preferably the plurality of walls are joined to defined a rectangular cross-section when viewed in plan.

The flocculator chamber 16 is bounded at the top by an influent zone 18 supplying liquid from an inlet 19 and at the bottom by an effluent zone 20. An important feature of the instant invention is that the front housing wall 10 is inclined inwardly, from the lower, effluent zone 20 to the upper, influent zone 18. The included angle between the inclined wall 10 and the bottom wall 22 of the housing H is preferably within the range of 45 degrees to 60 degrees from the horizontal, for reasons which will become apparent hereinafter. At least the majority of the extent of this inclined wall comprises a planar member, having an outer surface 24 and inner surface 26.

A buoyant coarse media bed 28 is adapted to be retained in the flocculator chamber 16, fully immersed within liquid as contained therein. This bed will be understood to comprise a plurality of similarly configured elements 30, preferably spherical and of any suitable solid or hollow buoyant material having a specific gravity less than that of water, such as polyethylene or polypropylene. By insuring that the periphery of the spherical elements 30 are smooth, flocs and biological growths will be allowed to rapidly slough off the media during cleaning thereof. It will be appreciated that the diameter of the media elements influences the magnitude of velocity gradients present within the media bed 28 and accordingly, by using recognized predictive equations for fluid flow through a porous media bed, it is planned that the diameter of elements 30 will range from approximately 10 mm to 50 mm, depending on the magnitude of velocity gradients desired, and will remain constant throughout vertical travel through the media bed.

The boyant media elements 30 are captively retained within the flocculator chamber 16 by means of a restrainer mechanism 32 adapted to be manipulated within the upper reaches of the flocculator chamber. This assembly includes a grating assembly 34 comprising a grating 36 that is horizontally fixed and which cooperates with a grating 38 that is horizontally shiftable with respect to the horizontally fixed grating 36. As will become apparent hereinafter, the two gratings 36,38 are horizontally displaceable relative one another. The material of the gratings must be anti-corrosive and capable of withstanding the uplift forces created during operation of the apparatus and comprises stainless steel, fiberglass or the like with the gratings being formed with preferably congruent, clear vertical openings 40 defining lateral dimensions less than the diameter of the media elements 30. As will be seen from FIGS. 1-3, the grating 36,38 are rectangular, define substantially equal lateral dimensions and move as a unit, during their manipulation.

Figure 4:
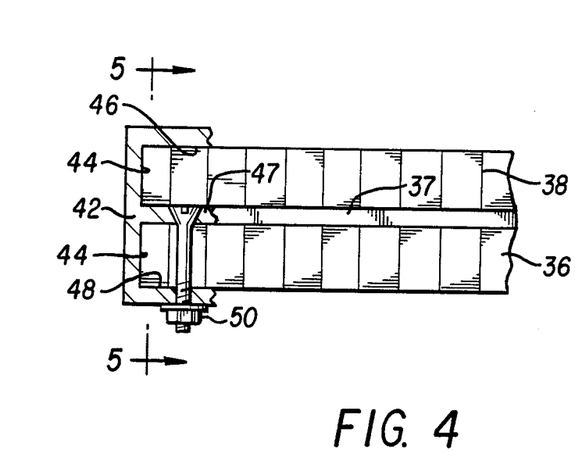
FIG. 4 is an enlarged, fragmentary view of one interlock channel serving to retain the two gratings in a juxtaposed slidable relationship.

The horizontally shiftable grating 38 will be seen to be slidably disposed atop the horizontally fixed grating 36 such that relative movement between the two gratings will be limited to solely a rectilinear displacement. The shiftable grating 38 is preferably located above the fixed grating 36 so that the underlying buoyant media for the most part do not impinge against the shiftable grating 38 during movement of the restrainer assembly. This limitation is assured by interlock members 42—42 engaging the lateral edges 44 of the two gratings as shown most clearly in FIG. 4. Each interlock member 42 includes vertically stacked first and second channels 46,48 within which the lateral edge 44 of the shiftable and fixed gratings 38 and 36, respectively, are housed. The channels 46,48 will be seen to be defined on either side of the interlock member central flanges 47 while the interlock members 42 are of a length no greater than that of the fixed grating 36 and are attached thereto, as by the fasteners 50. In this manner, the shiftable grating 38 may slide, to and fro, atop the fixed grating 36, as the grating assembly 34 is vertically displaced between the alternate positions shown in FIGS. 1 and 2 and friction between the two displaceable gratings is avoided in view of the vertical space or gap 37 therebetween, as formed by the thickness of the interlock member central flanges 47.

To achieve the above referenced vertical displacement of the grating assembly 34, two actuating and control parameters need to be addressed. First, means must be provided to accomplish the urging of the grating assembly in both an upward and downward direction and secondly, means are required to insure a smooth, continuous tracking of the outer ends 52,54 of the gratings 38,36 respectively, along the inclined inner surface 26 of the front wall 10 and inner surface 56 of the vertical rear wall 12, during the vertical movement thereof.

Figure 2:
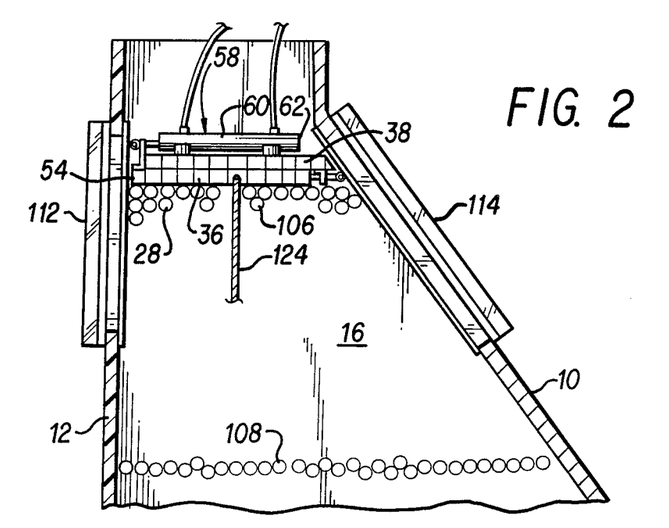
FIG. 2 is a fragmentary view of the flocculator of FIG. 1, illustrating the restrainer as it appears when contracted and at an alternate elevation.
Figure 3:
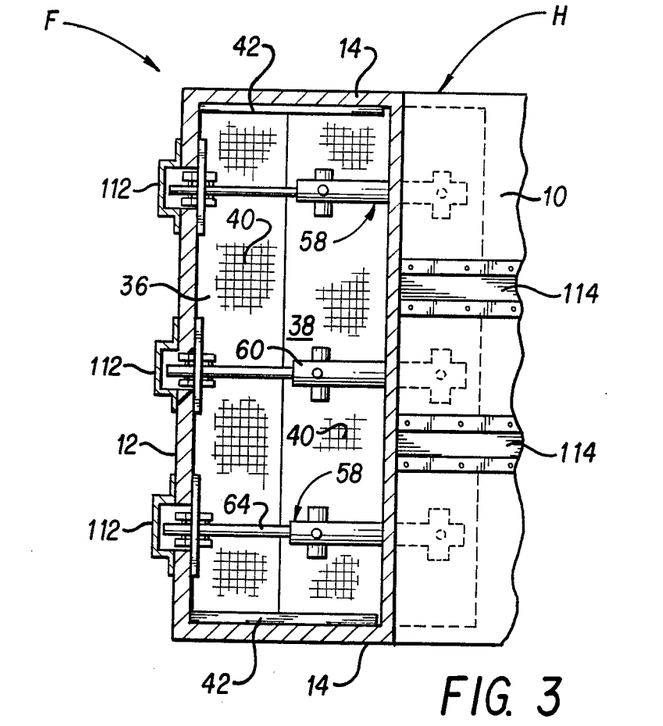
FIG. 3 is a horizontal sectional view, taken along the line 3—3 of FIG. 1.

One manner of producing the above vertical displacement of the grating assembly 34 is shown in FIGS. 1-3. Motor shifting means 58 are carried by the grating assembly and are actuated to horizontally slide the shiftable grating 38 relative the adjacent fixed grating 36. In view of the captive assembly of these two gratings by means of the lateral interlock members 42,42, any such relative slidable displacement of the gratings will be seen to either extend or contract the overall horizontal dimension of the grating assembly. This variation in the axial extent of the grating assembly cooperates with the tapered or inclined disposition of the housing front wall 10 to either raise or lower the plane of the grating assembly. The means for controlling the smooth, continuous tracking of the grating assembly during this vertical displacement thereof will be described following an explanation of the motor shifting means 58 shown in FIGS. 1-3.

The motor shifting means 58 comprises one or more fluid motors each including a cylinder 60 suitably affixed atop the shiftable grating 38 with its base 62 spaced inwardly from the grating outer end 52. A piston or actuating rod 64 axially extends from the cylinder 60 and has its outer portion secured to a support guide 66 attached to the fixed grating 36, adjacent its outer end 54. The actuating rod free end 68 will be seen most clearly from FIG. 6 to project through a vertical slot 70 provided through the housing rear wall 12 and which extends throughout the upper portion of the flocculator chamber 16.

Figure 5:
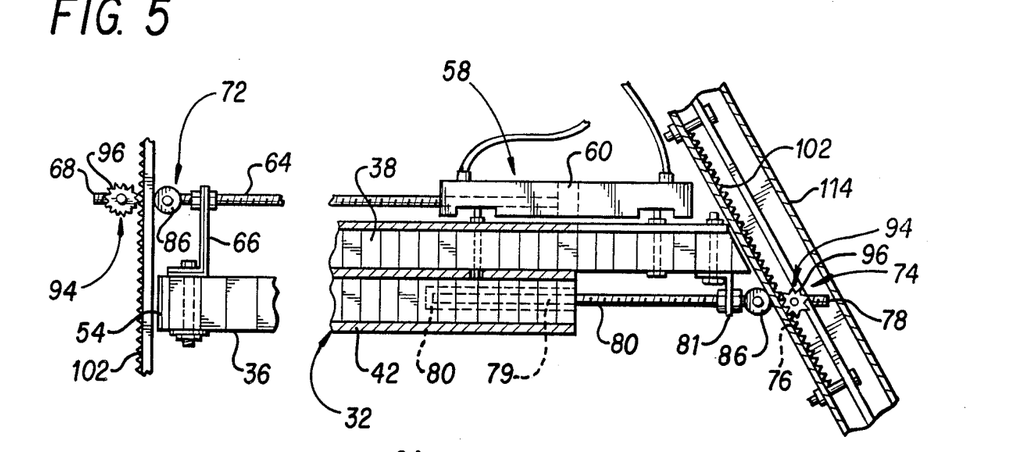
FIG. 5 is an enlarged side elevation illustrating the tracking assemblies shiftably attaching respective ends of the two gratings to opposed walls of the flocculator housing.
Figure 6:
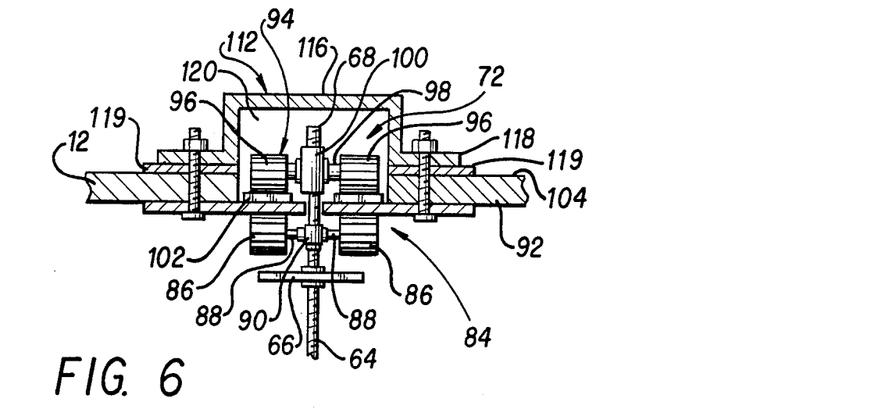
FIG. 6 is an enlarged horizontal sectional view of one of the tracking assemblies.

The rod free end 68 of each fluid motor is axially captively located with respect to the housing rear wall 12 by means of alignment and guide means in the form of a tracking assembly 72, illustrated in detail in FIGS. 5 and 6. A similar tracking assembly 74 is associated with a vertical slot 76 formed in the inclined front wall 10. This latter assembly 74 is mounted upon the free end 78 of a control rod 80 having its inner end 79 slidably disposed within a bore 81 in the inner end 82 of the fixed grating 36. The rod free end 78 is captively secured to the shiftable grating 38 by means of a support guide 81 carried by the grating 38.

The construction of the two tracking assemblies 72,74 is generally similar and accordingly a description of one will suffice for the other. The threaded rod end 68 or 78 each supports, within the flocculator chamber 16, a bearing mechanism 84 comprising twin rollers 86—86 respectively journalled upon axles 88—88 diametrically projecting from a central nut portion 90 carried by the threaded rod end. The slots 70,76 are preferably formed within mounting plates 92 overlying larger openings through the housing walls as shown in FIG. 6. In this manner, by selecting appropriate materials for the mounting plates, a low coefficient of friction may be provided for the constantly engaging rollers 86 and, installation and removal of an entire grating assembly 34 will be facilitated, without having to initially remove the plurality of tracking assemblies 72,74 from their respective rods 64 and 80.

Each threaded rod end 68,78 also supports a gear mechanism 94 comprising twin pinion gears 96—96 journalled upon axles 98—98 diametrically projecting rom a medial nut portion 100 carried by the rod end. The teeth of each gear 96 will be seen to engage the teeth of a gear rack 102 secured to the outer surface 104 of the rear wall 12 or outer surface 24 of the front wall 10.

To contain liquid that emerges through the slots 70,76 of the two opposed housing walls 12,10, each of these slots is provided with an enclosure removbly affixed to the exterior of the respective wall. As shown most clearly in FIGS. 3 and 6, each slot enclosure 112,114 defines a substantially hat-shaped configuration comprising an enlarged central portion 116 bounded by two lateral flanges 118 providing means for accepting suitable fasteners. A gasket or seal 119 of rubber or other suitable material is disposed intermediate each flange 118 and adjacent wall to prevent leakage of liquid that has passed through the slots 70,76, into the two enclosures. With this construction, the internal chamber 120 formed by the central portion 116 provides a fluid-tight raceway for the vertically shiftable tracking assemblies 72,74 while forming a dam or containment for liquid passing from the chamber 16 through the slots 70,76. The slots and associated enclosures quite obviously need to extend only throughout the limits of the vertical displacement of the restrainer mechanism 32 within the interior flocculator chamber 16.

With the foregoing construction in mind it will be appreciated that upon manipulation of the fluid cylinders 60, the extension and retraction of the actuating rods 64 alternately extends or contracts the shiftable grating 38 relative the fixed grating 36, with a corresponding vertical displacement of the entire restrainer mechanism 32. This action is assured, in view of the captive engagement of one edge of each of the two gratings 38,36, relative one housing wall 12 or 10 whereupon, any axial displacement of the cylinder rods 64 causes the shiftable grating 38 to be pulled toward or pushed away from, the rear housing wall 12. Since the outer end 52 of the shiftable grating 38 is maintained in constant juxtaposition to the housing inclined front wall 10 by the adjacent support guide 81 and attached tracking assembly 74, it will be appreciated that any relative horizontal movement between the two gratings is translated as a continuous vertical displacement of the entire restrainer mechanism 32. The smoothness of this latter movement is enhanced and controlled by the positive intermeshing between the tracking assembly gears 96, racks 102 and rollers 86.

Figure 7:
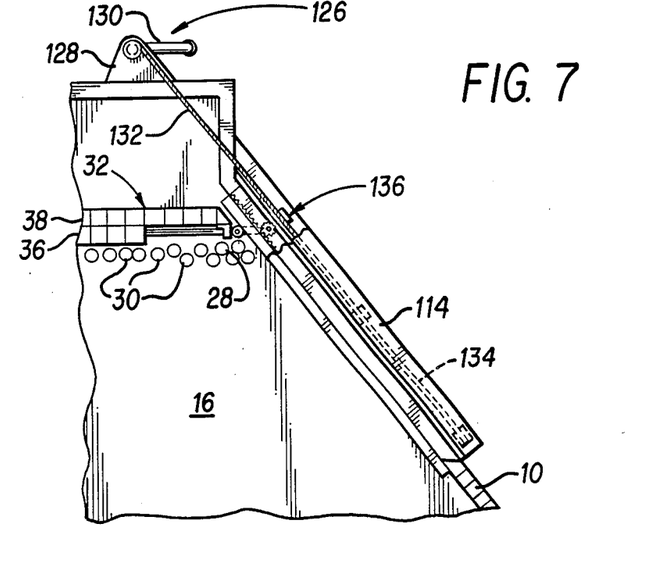
FIG. 7 is a partial, side elevation of an alternative embodiment of the restrainer assembly shifting mechanism.
Figure 8:
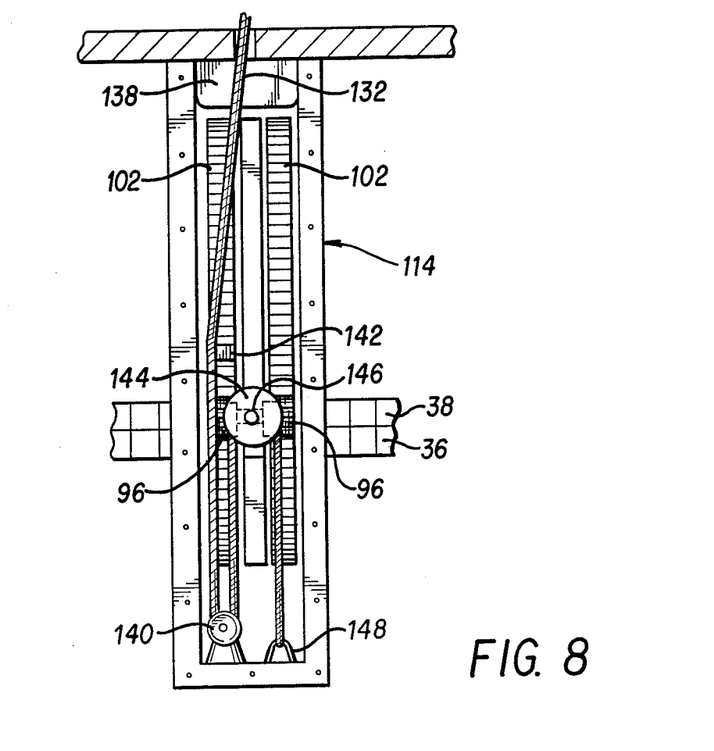
FIG. 8 is a front elevation, partly in section, taken along the line 8—8 of FIG. 7.

FIGS. 7–8 depict an alternative restrainer assembly shifting means, generally designated 126. In this embodiment, instead of fluid motors 60 carried by the horizontally shiftable grating 38, a winch assembly 128 is utilized and includes a crank or motor 130 providing take-up means for a cable 132 leading to the interior 134 of the slot enclosure 114 of each tracking assembly 136 on the inclined front wall 10. Each cable 132 will be seen from FIG. 8 to enter the top of the slot enclosure through a guide in the enclosure top 138 and is sheaved about a bottom pulley 140. A cable guide 142 located above the medial point of the slot enclosure precludes interference between the cable 132 and the vertically shiftable tracking assembly associated with the horizontally sliding grating 38.

The cable 132 passes upwardly from the fixedly disposed bottom pulley 140 and is sheaved about a tracking assembly pulley 144 journalled upon the end 146 of the tracking assembly control rod 80. In this embodiment, the rod end 146 is angled upwardly to place the plane of the pulley 144 parallel with the plane of the inclined wall 10. The cable 132 extends downwardly from the tracking assembly pulley 144 and is secured to an anchor point 148 at the bottom of the enclosure 114.

With the above construction in mind, it will be seen that, upon manipulation of the winch assembly 128, the effective length of the cable 132 is shortened or lengthened and respectively lowers or raises the restrainer mechanism 32, with the resultant contraction or extension of the gratings 36,38 as previously described.

In the operation of the flocculator F, using either type of restrainer mechanism described above, as is best shown in FIG. 1, liquid to be treated is admitted to the influent zone 18 inlet 19 by any well known means and enters through the plurality of openings 40 of the two gratings 26,38. The liquid passes through the entire vertical extent of the media bed 28, from the media top surface or area 106, to the media effluent zone 20 beneath the media bed bottom surface or area 108. During this downward fluid flow, flocs are formed by the continuous flow of liquid through the interstices created by the media elements 30. The flocculated liquid then flows through a screened or perforated outlet 110 provided adjacent the housing bottom wall 22, from which it is directed downstream for further treatment, such as sedimentation.

To adjust velocity gradients across the media bed, the motor shifting means 58 or winch assembly 128 is actuated to allow the restrainer assembly 32 to move gradually upwardly or downwardly to a new fixed elevation, the range of movement being limited to the length of slots 70,76. Since the rate of flow through the media bed is constant, decreasing the cross section of the media bed by adjusting media restrainer assembly 32, increases the interstitial velocity of flow at that point. Increasing the interstitial velocity increases the velocity gradient, which is a measure of the degree of mixing in the flocculation chamber. For the range of velocity gradients normally encountered in water treatment (120 sec$^{-1}$ to 10 sec$^{-1}$) the required extent of vertical displacement of restrainer assembly 32 is only 1–2 feet.

The velocity gradient in a coarse media flocculator may also be changed by varying the flow rate across the media bed. This may be accomplished by arranging plural flocculators in parallel, and by varying the number of flocculators in service. The liquid flow is then divided evenly among several flocculator units by suitable means such as a common inlet header channel with adjustable weirs at each flocculator inlet or, submerged inlet pipes with throttling valves to modulate the flow. Increasing the number of flocculator units increases the flexibility of the system. It should be noted, however, that varying the flow rate in a single flocculator unit will vary the liquid detention time in the unit proportionally. The capability for adjustment of both the chamber detention time and velocity gradient is helpful in optimizing the size and density of flocs produced by the device.

The most obvious alteration of the media bed parameters during shifting of the grating assembly 34, such as between the elevated position of FIG. 2 and the lower position of FIG. 1, is that the cross-sectional areas of the media top surface 106 and bottom surface 108 are substantially increased while the vertical height of the bed is reduced. In addition to a variation in the flocculation characteristics, this media bed alteration produces a noticeable fluctuation in the upward forces of the buoyant media upon the overlying grating assembly 34. These uplift forces can be significant, especially when the grating assembly is disposed in or adjacent its uppermost elevation and wherein the media bed 28 exhibits a maximum vertical height between its top and bottom surfaces 106,108. As an example, with a media volume of 300 cu. ft., media porosity of 0.38 and a media specific gravity of 0.8, a total media uplift force of approximately 1,420 lb. is created. To preclude undo stress upon the grating assembly and minimize binding between the relatively slidable gratings 36,38, it may be necessary to suspend one or more counterweights 122 within the effluent zone 20, from the intermediate area of the fixed grating 36 by cables 124. Preferably, the mass of the counterweight(s) 122 is selected to insure that at all adjustments of the grating assembly 34, a positive uplift force is applied to the gratings 36,38.

During operation, it is anticipated that, following an initial start-up period, during which media bed 28 will become partially clogged with entrapped flocs, a steady-state effluent floc size distribution will be reached, and the entrapment and release of floc particles within the media bed will be roughly equal. Accordingly, the downflow flocculator F should be considered as a flow through device, not a filtering device, with minimal retention of floc in the media bed. Cleaning of media bed 28 will be required relatively infrequently unless the particulate loading is unusually high or fluctuates widely.

It is further anticipated that the presence of previously deposited flocs in media bed 28 will improve the operation of the device significantly by increasing the concentration and collision frequency of flocs flowing through the bed. Hence, dosages of coagulant chemicals will tend to be lower than would be required to operate other types of flocculators.

Occasionally, the buoyant media bed will have to be cleaned as the head loss (pressure drop) across the bed builds up beyond an acceptable level. Cleaning is accomplished by invoking an air scour system comprising a plurality of laterally adjacent perforated pipe laterals 150 disposed upon the bottom wall 22 of the flocculator housing H, as shown in FIG. 1. Compressed air is admitted to the laterals 150 through an air inlet 152 at a rate sufficient to release entrapped floc from the buoyant media bed 28. During this action, the admission of the air causes the media elements 30 to become dislodged and during the resultant expansion of the bed, media elements will swirl throughout the chamber 16. The housing outlet 110 includes screening having openings smaller than the dimension of the media elements 30 in order to preclude their passage therethrough. The total area of the outlet opening is sized to provide a low velocity of outlet flow, on the order of 0.5 ft./sec., to prevent shearing of floc as they are conveyed from the flocculator to a sedimentation basin or filters. The air scouring is of relative short duration, being sufficient to dislodge but a portion of the entrapped flocs. This insures that a majority of the flocs are retained in the media bed to enhance the flocculation process.

The introduction and removal of media elements 30 from the flocculator chamber 16 may be accomplished by any suitable well known means, such as a pressure/suction tank (not shown) and wherein the media elements 30 are admitted and extracted, through an appropriate valved media port 154 in one housing side wall 14. The liquid detention time for flocculation can be easily varied by this procedure.

It will be understood that existing mechanical flocculation chambers could readily be retrofitted to conform to the present invention by introducing a slotted front wall made of stainless steel, fiberglass, plastic or other rigid material inside of the chambers, and attaching this wall to the sides and bottom of the chamber at the desired angle of inclination, thereby providing a suitable enclosure for a bed of buoyant coarse media. An opposite, slotted vertical rear wall would be inserted, opposed to the inclined wall. In addition, the present construction could readily be incorporated into reactor-clarifiers, often used in wastewater treatment plants, which are center-feed clarifiers with flocculation zones built into the central compartment. The use of buoyant media would eliminate short-circuiting within the flocculation zone and promote better flow distribution patterns in the sedimentation zone of reactor-clarifiers.

As will be clear to those skilled in the relevant art, numerous modifications and embellishments of the present invention are possible. The above description of the present invention is intended only as illustrative of the fundamental concepts of the present invention, and hence all modifications which lie within the scope of the appended claims may be utilized.

I claim:

1. In a flocculator apparatus having a housing including two opposite walls with one said wall disposed at an upwardly and inwardly inclined angle to define an interior flocculator chamber constructed and arranged to form a continuously decreasing horizontal cross-sectional area from a lowermost effluent zone to an uppermost influent zone, and a media bed within said chamber comprising buoyant coarse media, the improvement comprising;

a restrainer mechanism overlying said media bed,
   said restrainer mechanism including a plurality of gratings,
   means vertically interlocking said gratings relative one another while allowing relative horizontal displacement therebetween, and
   shifting means engageable with said restrainer mechanism and operable to horizontally displace one of said gratings relative another one of said gratings and simultaneously vertically displace said restrainer mechanism within said flocculator chamber, wherein
   displacement of said gratings alters the cross-sectional area defined by said gratings as well as the horizontal and vertical extent of said media bed.

2. A flocculator apparatus according to claim 1 wherein,
   said inclined wall comprises a front wall, and
   said housing walls including a substantially vertically disposed rear wall opposed to said inclined front wall.

3. A flocculator apparatus according to claim 1 wherein,
   said bed of buoyant media comprises individual elements of substantially uniform size.

4. A flocculator apparatus according to claim 1 wherein,
   said bed or buoyant media comprises individual spherical elements of substantially uniform size.

5. A flocculator apparatus according to claim 1 wherein,
   said bed of buoyant media comprises individual spherical elements of substantially uniform diameter in the range of between approximately 10 mm and approximately 50 mm.

6. A flocculator apparatus according to claim 1 wherein,
   said gratings include outer and inner ends and opposite lateral edges, and
   said interlocking means comprises multi-channel elements respectively engaging said lateral edges of said plurality of gratings.

7. A flocculator apparatus according to claim 1 wherein, said gratings include a horizontally fixed grating and a horizontally shiftable grating each having outer and inner ends, and alignment and guide means fixedly carried by each said grating respectively engaging each of said two opposite walls.

8. A flocculator apparatus according to claim 7 wherein, said inclined wall comprises a front wall, said housing walls including a substantially vertically disposed rear wall opposed to said inclined front wall, a slotted plate on each said front and rear wall, each said alignment and guide means comprising a tracking assembly including a shaft disposed through one said slotted plate, bearing means on said shaft engageable with one side of each said slotted plate and first gear means on said shaft disposed on another side of each said slotted plate, and mating second gear means fixedly disposed adjacent said another side of each said slotted plate and in engagement with said first gear means.

9. A flocculator apparatus according to claim 8, including, an enclosure member overlying said another side of each said slotted plate.

10. A flocculator apparatus according to claim 1 including, a bottom wall on said housing, a liquid outlet in said housing adjacent said effluent zone, and air scouring means in said housing effluent zone overlying said bottom wall.

11. A flocculator apparatus according to claim 1 wherein, said shifting means includes a fluid cylinder affixed to one said grating and having an axially displaceable actuating rod secured to another one said grating.

12. A flocculator apparatus according to claim 1 wherein, said shifting means includes a winch and cable mechanism operable to shorten and lengthen a cable engageable with said restrainer mechanism.

13. A flocculator apparatus according to claim 1, including, a counterweight suspended from said restrainer mechanism by a cable, and said counterweight disposed within said effluent zone beneath said media bed.

* * * * *